(12) United States Patent
Shin et al.

(10) Patent No.: US 10,361,006 B2
(45) Date of Patent: Jul. 23, 2019

(54) LASER WELDING APPARATUS FOR SPACER GRID OF NUCLEAR FUEL ASSEMBLY

(71) Applicant: KEPCO NUCLEAR FUEL CO., LTD., Daejeon (KR)

(72) Inventors: Dong Kwang Shin, Daejeon (KR); Byeong Eun Oh, Daejeon (KR); Kwang Ho Yun, Daejeon (KR); Sang Jae Han, Daejeon (KR); Jong Sung Hong, Daejeon (KR); Kwang Seok Cha, Chungcheongnam-do (KR); Wun Su Hong, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 1097 days.

(21) Appl. No.: 14/663,909

(22) Filed: Mar. 20, 2015

(65) Prior Publication Data
US 2016/0155520 A1     Jun. 2, 2016

(30) Foreign Application Priority Data

Nov. 27, 2014 (KR) .................. 10-2014-0167362

(51) Int. Cl.
| | |
|---|---|
| *G21C 3/34* | (2006.01) |
| *B23K 26/21* | (2014.01) |
| *B23K 26/03* | (2006.01) |
| *B23K 26/08* | (2014.01) |

(Continued)

(52) U.S. Cl.
CPC ............ *G21C 3/3424* (2013.01); *B23K 26/03* (2013.01); *B23K 26/083* (2013.01);
(Continued)

(58) Field of Classification Search
CPC ...... G21C 3/3424; G21C 3/336; G21C 21/00; B23K 26/03; B23K 26/127; B23K 26/083;
(Continued)

(56) References Cited

U.S. PATENT DOCUMENTS

| | | | | |
|---|---|---|---|---|
| 4,501,949 | A * | 2/1985 | Antol ................. | B23K 26/1437 219/121.63 |
| 4,993,759 | A * | 2/1991 | Thomas ................. | E05C 3/047 292/106 |

(Continued)

FOREIGN PATENT DOCUMENTS

| | | |
|---|---|---|
| DE | 10 2004 057 866 A1 | 6/2006 |
| JP | H 09-295180 A | 11/1997 |

(Continued)

OTHER PUBLICATIONS

Preliminary Search Report of French Patent Office dated Jan. 26, 2018.

*Primary Examiner* — Dana Ross
*Assistant Examiner* — Joseph M Baillargeon
(74) *Attorney, Agent, or Firm* — Rabin & Berdo, P.C.

(57) ABSTRACT

Provided is a laser welding apparatus for spacer grid of nuclear fuel assembly comprising a base frame in which a chamber installment hole is formed horizontally to the center in a way that the hole penetrates the chamber and a guide rail is installed along the chamber installment hole; a welding chamber unit assembled with the base frame in guidance by the guide rail and equipped with an operable door in front and a glass window at the top to be airtight; a laser welding unit mounted on the base frame for radiating laser through the glass window to weld spacer grid in the welding chamber; and a locking member for fixing the welding chamber on the base frame.

5 Claims, 7 Drawing Sheets

(51) Int. Cl.
  *B23K 26/12* (2014.01)
  *B23K 37/02* (2006.01)
  *G21C 3/336* (2006.01)
  *G21C 21/00* (2006.01)
  *G21C 21/10* (2006.01)

(52) U.S. Cl.
  CPC ........ *B23K 26/0876* (2013.01); *B23K 26/127* (2013.01); *B23K 26/21* (2015.10); *B23K 37/0235* (2013.01); *G21C 3/336* (2013.01); *G21C 21/10* (2013.01); *Y02E 30/40* (2013.01)

(58) Field of Classification Search
  CPC .. B23K 26/0876; B23K 37/0235; Y02E 30/40
  USPC .............. 219/121.6, 121.63, 121.64, 121.86; 70/58, 69, 78
  See application file for complete search history.

(56) References Cited

U.S. PATENT DOCUMENTS

| | | | | |
|---|---|---|---|---|
| 5,221,515 A | * | 6/1993 | Thiebaut | B23K 26/08 219/121.64 |
| 5,456,504 A | * | 10/1995 | Brillant | E05B 63/248 292/63 |
| 2013/0004607 A1 | | 1/2013 | Hoechsmann et al. | |

FOREIGN PATENT DOCUMENTS

| | | |
|---|---|---|
| JP | 2000-164095 A | 6/2000 |
| KR | 10-2009-0032770 A | 4/2009 |
| KR | 10-0922162 B1 | 10/2009 |
| KR | 10-2013-0047768 A | 5/2013 |
| WO | WO 2012/057025 A1 | 5/2012 |

\* cited by examiner

LASER WELDING APPARATUS FOR SPACER GRID OF NUCLEAR FUEL ASSEMBLY

BACKGROUND OF THE INVENTION

Field of the Invention

The present invention relates to a laser welding apparatus for spacer grid of nuclear fuel assembly, and more particularly to a laser welding apparatus enhancing serviceability.

Description of the Related Art

A nuclear reactor is equipment that is made to control nuclear fission artificially to generate energy, or to be used for various purposes such as production of radioisotope or plutonium, or radiation field formation, etc.

In general, light water reactor nuclear power plant uses enriched uranium in which ratio of uranium-235 is increased by 2 to 5%. For nuclear fuel to be used in nuclear reactors, fuel fabrication is processed in a way that cylindrical pellet hefting about 5 g is made of uranium. In order to manufacture a fuel rod, theses pellets come charging zircaloy cladding and spring and helium gas are put in and then an end plug is welded in a rod end. The fuel rods are charged in skeleton finally to form a fuel assembly and combusted by nuclear reaction in the nuclear reactor.

Spacer grid in nuclear fuel assembly which forms skeleton with a fuel rod, instrument tube, and guide tube, is made by dozens of spacer grid straps. Each spacer grid strap has a plurality of incision parts such as a slot. Spacer girds are placed longitudinally and laterally at regular interval so that spacer grid straps cross each other respectively. Thus incision parts are interconnected to each other by fitting to each other so that spacer grid forms grid space.

However these spacer grid straps are interconnected to each other by inserting into incision parts, spacer grid strap itself sways because of gaps in most incision parts. Thus the points of intersection where spacer grid straps cross each other cross parts, and parts in which connection is not solid such as outside, corner, etc. are welded in order to prevent spacer grids from swaying. Laser welding is mostly used for the welding method of spacer grid.

For example, the present applicant's Korean Patent No. 10-0922162 registered on 9 Oct. 2009 suggests a laser welding device for spacer grid of nuclear fuel assembly for enhancing workability and productivity.

The present inventor intends to improve further this conventional laser welding device for spacer gird of nuclear assembly.

DOCUMENTS OF RELATED ART

Korean Patent No. 10-0922162 (Registration Date: 9 Oct. 2009)

SUMMARY OF THE INVENTION

The present invention is to improve the conventional laser welding device for spacer grid, and particularly to provide a laser welding apparatus which can enhance maintainability.

The laser welding apparatus according to the present invention for accomplishing these objectives comprises a base frame in which a chamber installment hole is formed horizontally to the center in a way that the hole penetrates the chamber and a guide rail is installed along the chamber installment hole; a welding chamber unit assembled with the base frame in guidance by the guide rail and equipped with an operable door in front and a glass window at the top to be airtight; a laser welding unit mounted on the base frame for radiating laser through the glass window to weld spacer grid in the welding chamber; and a locking member for fixing the welding chamber on the base frame.

Preferably the locking member according to the present invention comprises a locking block protruding from the bottom of the welding chamber unit; a locking arm arranged so as to be pivoted to the base frame to support the locking block; and a locking pin mounted on the base frame for restricting rotation of the locking arm.

Preferably the locking member according to the present invention comprises a driving unit installed on the bottom surface of the chamber installment hole for driving the load back and forth; a bracket installed on the bottom surface of the chamber installment hole; and a locking lever assembled so as to be pivoted to the bracket and rotated by the load to support the welding chamber unit.

More preferably, the locking lever further comprises a roller enabling to pivot to the end where the locking lever contacts the welding chamber.

Preferably, the base frame according to the present invention further comprises a glass cover arranged to cover the glass window. And more preferably, the glass window is fixed on the flange in which a ventilation hole interconnected with the welding chamber unit is formed. And the flange is characterized by a ventilation valve arranged in it and controlled to be opened or closed by the glass cover.

Preferably the welding chamber unit according to the present invention comprises a position detecting unit for detecting the standard position of a driving pad which rotates a welding rotation plate in which the spacer gird is settled, and outputting an electrical detection signal.

The laser welding apparatus for spacer grid of nuclear fuel assembly according to the present invention arranges the base frame and the welding chamber mounted on the base frame for welding spacer grids so that the base frame and the welding chamber unit can be detached at the rear, and it can enhance work convenience at maintenance activities.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Specific configuration or functional descriptions which set forth in exemplary embodiments according to the present invention are only for the purpose of describing exemplary embodiments, and the exemplary embodiments according to the concept of the present invention can be practiced in various forms. Thus the present invention is not limited to the described exemplary embodiments and all of appropriate variations, modifications and equivalents are considered to pertain to the scope of the present invention.

Meanwhile, the terms used in the specification are for describing specific exemplary embodiments and they are not meant to limit the present invention. Singular expressions imply both singular and plural meaning unless they are distinctly different by context. Terms like "Comprise" or "have" and etc. in the specification intend to specify that the characteristic of practice, number, process, operation, component, part, or any combination thereof exist and they exclude neither existence of one or more of other characteristics, numbers, operations, parts, or any combination thereof nor additional potentiality.

Specific exemplary embodiment of the present invention will be explained from the following detailed description when taken in conjunction with the accompanying drawings as follows.

Figure 1:
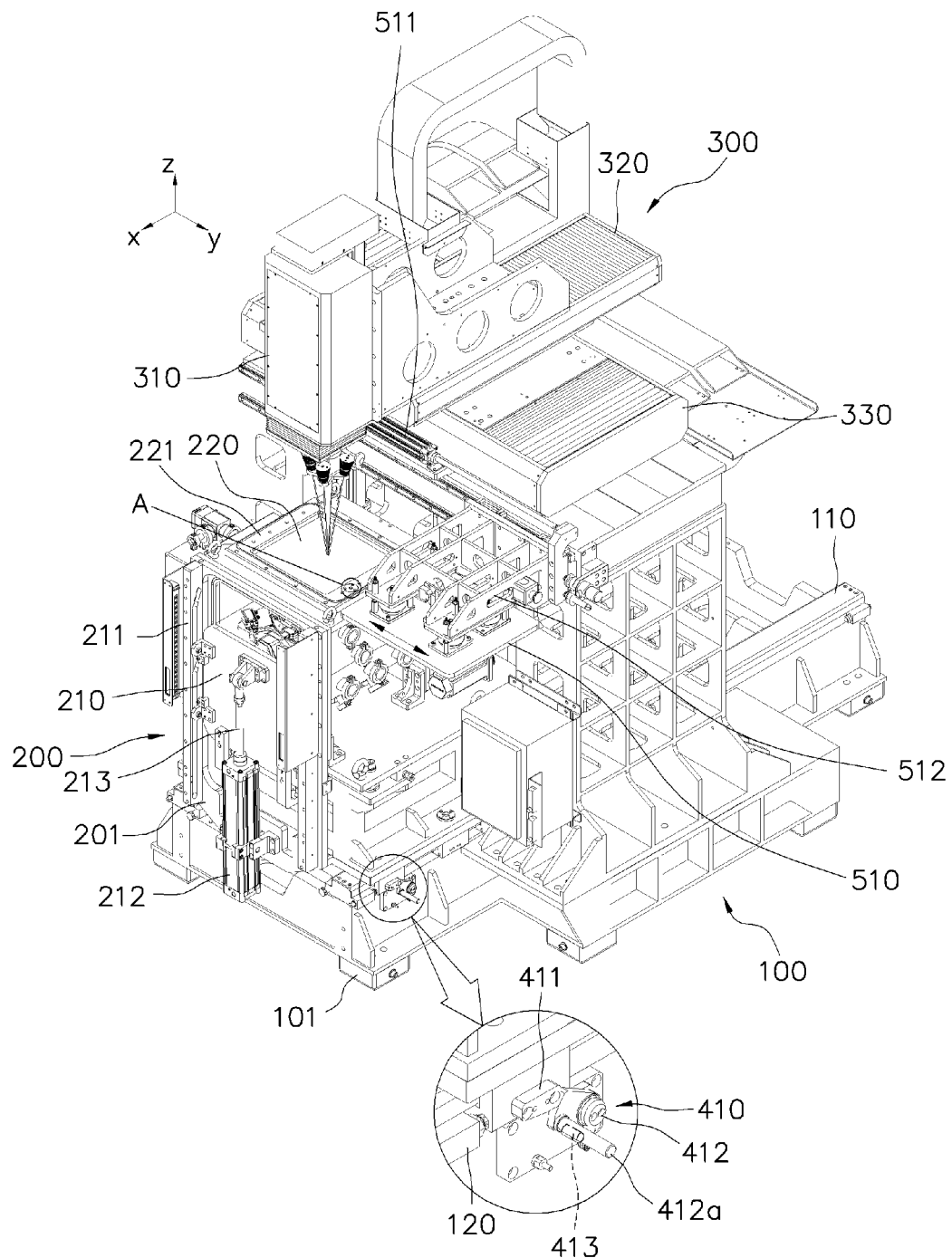
FIG. 1 illustrates a perspective view of a laser welding apparatus for spacer grid of nuclear fuel assembly according to the present invention.

With reference to FIG. 1, a laser welding apparatus for spacer grid according to the present invention (hereinafter "a welding apparatus") comprises a base frame 100, a welding chamber unit 200 detachably mounted on the base frame 100 in which welding spacer grid is performed, a laser welding unit 300 for welding spacer grid by radiating laser into the laser chamber unit 200, and a locking member 410 for fastening the detachable welding chamber unit 200 on the base frame 100.

The base frame 100 on which main units are mounted has the laser welding unit 300 mounted on the top, and has a chamber installment hole formed horizontally through in the center in which the welding chamber unit 200 is installed. A guide rail 110 is arranged along the chamber installment hole so the welding chamber unit 200 can be installed or detached in guidance by the guide rail 110.

An adjustment block 101 can be arranged in the lower part of the base frame 100 so that the position of the base frame 100 can be precisely adjusted from side to side or in its height by the adjustment block 101.

A damper 120 is arranged in the end of the guide rail 110, the welding chamber unit 200 enters along the guide rail 110 and it is restricted to move forward by the damper 120.

The welding chamber unit 200 is equipped with an operable door 210 in the front and a glass door window 220 at the top to be airtight in a closed structure.

Specifically, the door 210 is arranged to be slidable up and down at the chamber 201, wherein the both ends of the door 210 can be slided up and down in guidance by the rail 211 arranged parallel to the chamber 201.

A operable cylinder 212 is installed in the lower part of the door 210 in the chamber 201, and the end of a cylinder load 213 operated by the operable cylinder 212 is assembled with the door 210 by a hinge, and then the door 210 is opened or closed by the operable cylinder 212.

The operable cylinder 212 can be automatically opened and closed by a control panel in sync with a loading device which charges automatically a spacer grid to be welded.

Meanwhile, a glass cover 510 can be arranged adjacently to the glass window 220 on the top of the base frame 100, the upper part of the glass cover 510 is supported by a cover bracket 512, and the cover bracket 512 is movable horizontally by a driving means including the driving cylinder 511 installed in the base frame 110. Thus the glass cover 510 is arranged to cover the glass window 220.

Preferably, a ventilation hole connecting to the welding chamber unit 200 is formed in the side wall inside the flange 221 to which the glass window 220 is fixed, and a ventilation hole is arranged in the upper part of the flange 221. Thus a ventilation valve operated by the glass cover 510 can be arranged.

Figure 6:
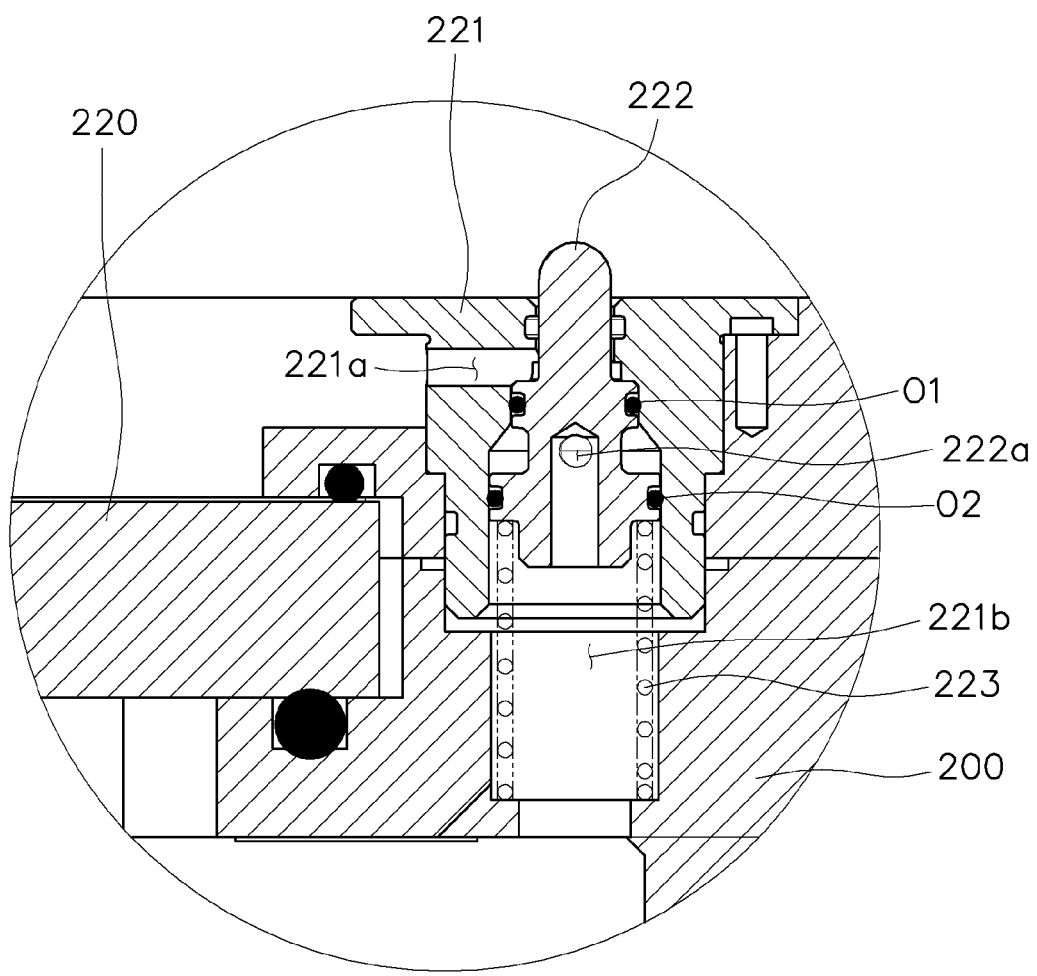
FIG. 6 and FIG. 7 illustrate an enlarged longitudinal section of part A in FIG. 1.
Figure 7:
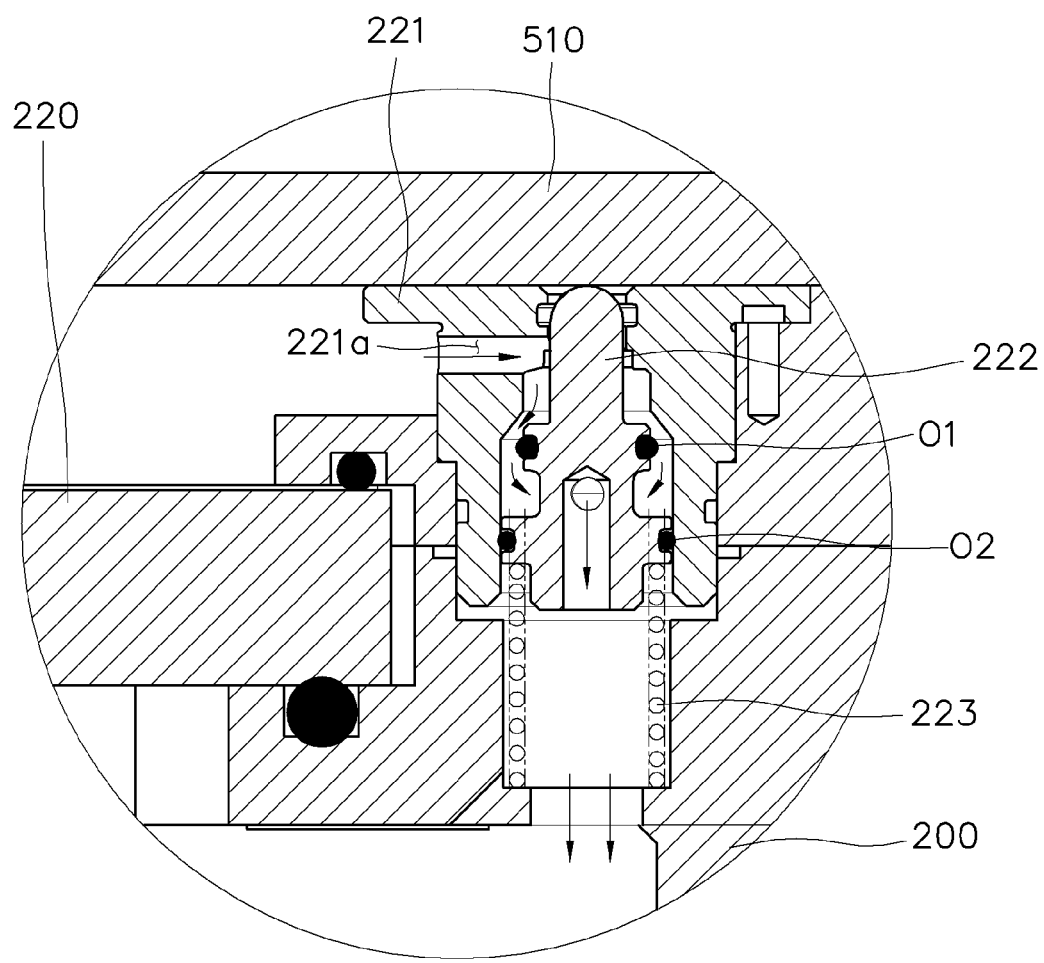

FIG. 6 and FIG. 7 are the enlarged longitudinal section showing respective opening and closing operation of the ventilation valve.

With reference to FIG. 6, a ventilation hole 221a connecting to the inside of the welding chamber unit 200 is formed in the side wall inside the flange 221 to which the glass window 220 is fixed. A ventilation valve 222 is arranged at the flow path 221b which is interconnected with the ventilation hole 221a and the inside of the welding chamber unit 200.

The ventilation valve 222 is supported by an elastic body 223, and arranged around the flow path.

The first airtight member 01 and the second tight member 02 are inserted in the upper part and lower part of the ventilation valve 222 so the ventilation valve 222 can be airtight with the welding chamber unit 200. At this time, the first airtight member 01 comes apart from the inside wall of the welding chamber unit 200 according to the vertical position of the ventilation valve 222 and the ventilation hole 221a and a flow path 221b are interconnected with each other in structure.

With reference to FIG. 7, if the glass cover 510 covers the glass window 220, the glass cover 510 comes to press the ventilation valve 222. Thus, as the first airtight member 01 comes apart from the welding chamber unit 200, the ventilation hole 221a and the flow path 221b are interconnected.

In this way, vacuum operation is proceeded in the welding chamber unit 200 with the glass window 220 covered by the glass cover 510. Thus, the vacuum operation inside the welding chamber unit 200 can be done without pressure difference for the glass window 220, itself. Then, the vacuum operation is done inside the welding chamber unit 200, and oxygen and moisture etc. are removed inside the welding chamber unit 200, and then argon gas is injected to make the pressure higher than the atmospheric pressure, and then the glass cover 510 is moved to be opened and then laser welding operation is proceeded.

Figure 2:
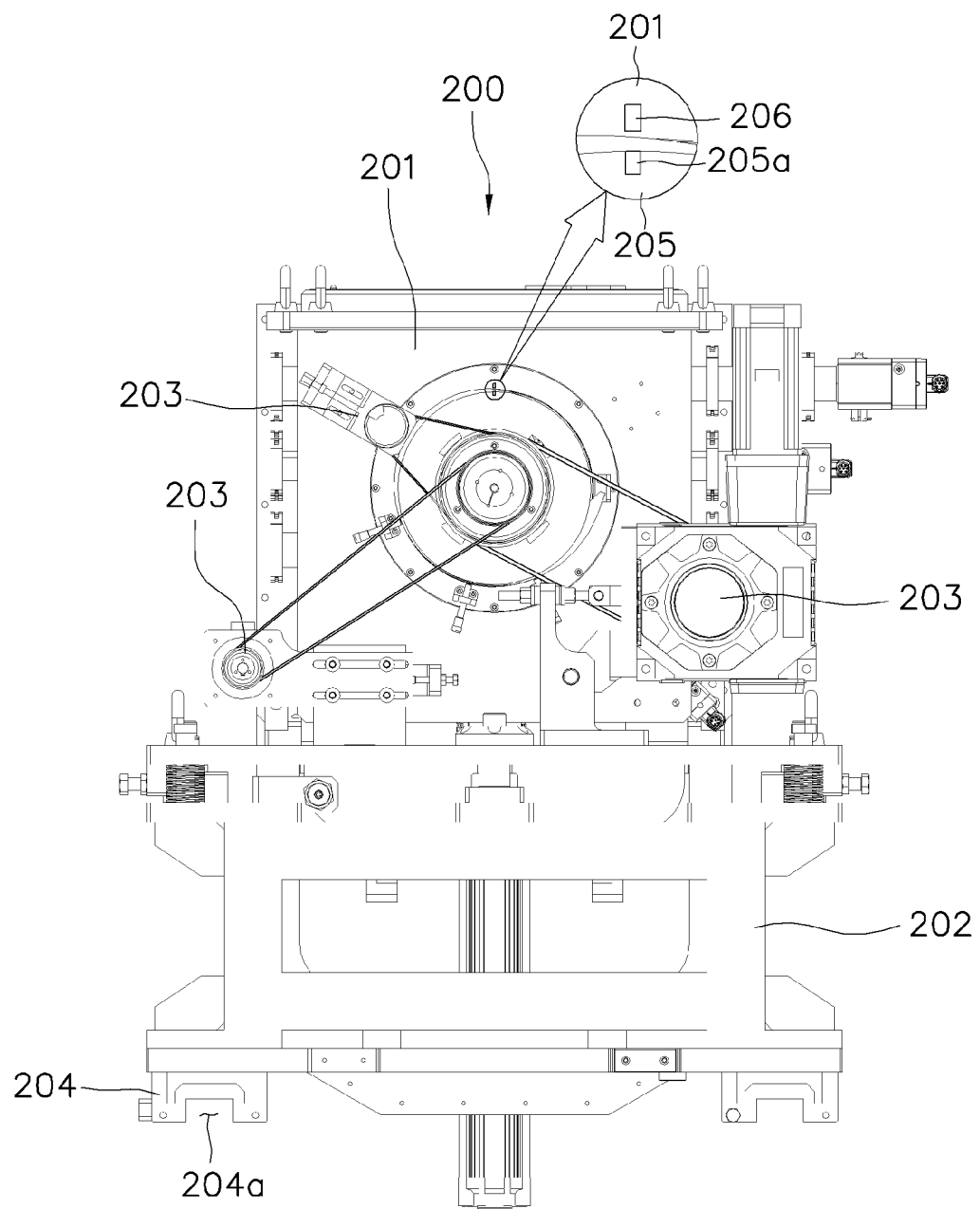
FIG. 2 illustrates a rear view of a welding chamber unit in a laser welding apparatus for spacer grid of nuclear fuel assembly according to the present invention.

FIG. 2 is a rear view of a welding chamber unit in a laser welding apparatus for spacer grid of nuclear fuel assembly.

As illustrated in FIG. 2, a welding chamber unit 200 comprises a chamber frame 202.

A chamber 201 is installed in the upper part of the chamber frame 202 in which a plurality of driving unit 203 connected by a driving pad 205 and belt are installed to operate tilting and rotation of a welding rotation plate arranged inside the chamber 201.

Preferably, a position detection unit which can output electrical detection signal by detecting the standard position of a driving pad 205 can be arranged, the signal from the position detection unit is transmitted to a loading device which charges automatically a spacer grid in the welding chamber unit so that a spacer grid can be charged only at the right position by the welding rotation plate during the automatic loading process. Thus, it can prevent a malfunction that may occur in the automatic loading process of the spacer grid.

This position detection unit can be provided by groove 205a and a light sensor 206 installed in the chamber 201 for detecting the position of the groove. There is no limit to a sensor for detecting the position; a variety of known sensors can be used for detecting position.

In this way, a driving unit 203 for tilting and spinning a welding rotation unit is installed not in a base frame but a chamber frame 202. Thus, belt length can be shortened, which is advantageous in terms of backlash, and separation of the welding unit from the base frame for maintenance can be easy by excluding structural connection between the base frame and the welding chamber unit.

In the lower part of the chamber frame 202, the guide block 204 corresponding to the guide rail 110 (See FIG. 3) is arranged and the groove 204a is formed in the guide block 204. Also, the chamber frame 202 can be moved horizontally along the chamber installment hole in guidance by the guide rail 110.

Again with FIG. 1, the laser welding unit 300 comprises a vertical stage 310 which can be vertically driven by mounting an optical adapter with which welding is performed to a part to be welded using an optical cable connected to a laser generation unit, a horizontal table 320, 330 for enabling the vertical stage 310 to be driven horizontally on xy plane.

The vertical stage 310 can be vertically moved up and down by a guidance meaning such as LM guide, and light source and an image sensor can be added to the vertical stage in order to monitor the welding status.

In the present exemplary embodiment, the horizontal table 320, 330 comprises x-axis table 320, and y-axis table 330. In here the vertical stage 310 is settled on the upper part of the x-axis table 320, x-axis table 320 is settled on the upper part of the y-axis table 330. The x-axis table 320 can be moved in x-axis direction on the upper part of the y-axis table 330, and the y-axis table 320 can be moved in y-axis direction.

A servo motor is arranged to drive the vertical stage 310 and the horizontal table 320, 330 respectively so that their positions can be precisely controlled.

A locking member 410 is for fixing the welding chamber unit 200 to the base frame 100, and can be provided by a locking block 411, a locking arm 412, and a locking pin 413. The locking block 411 is arranged to be protruded in the lower part of the welding chamber unit 200. The locking arm 412 is arranged to meet the base frame 100 and support the locking block 411. The locking fin 413 restricts the rotation of the locking arm 412 by being assembled to the base frame 100.

In the locking arm 412 a handle bar 412a is arranged to protrude in rotation axis direction so that rotation of the locking arm 412 can be operated by operating the handle bar 412a.

Figure 3:
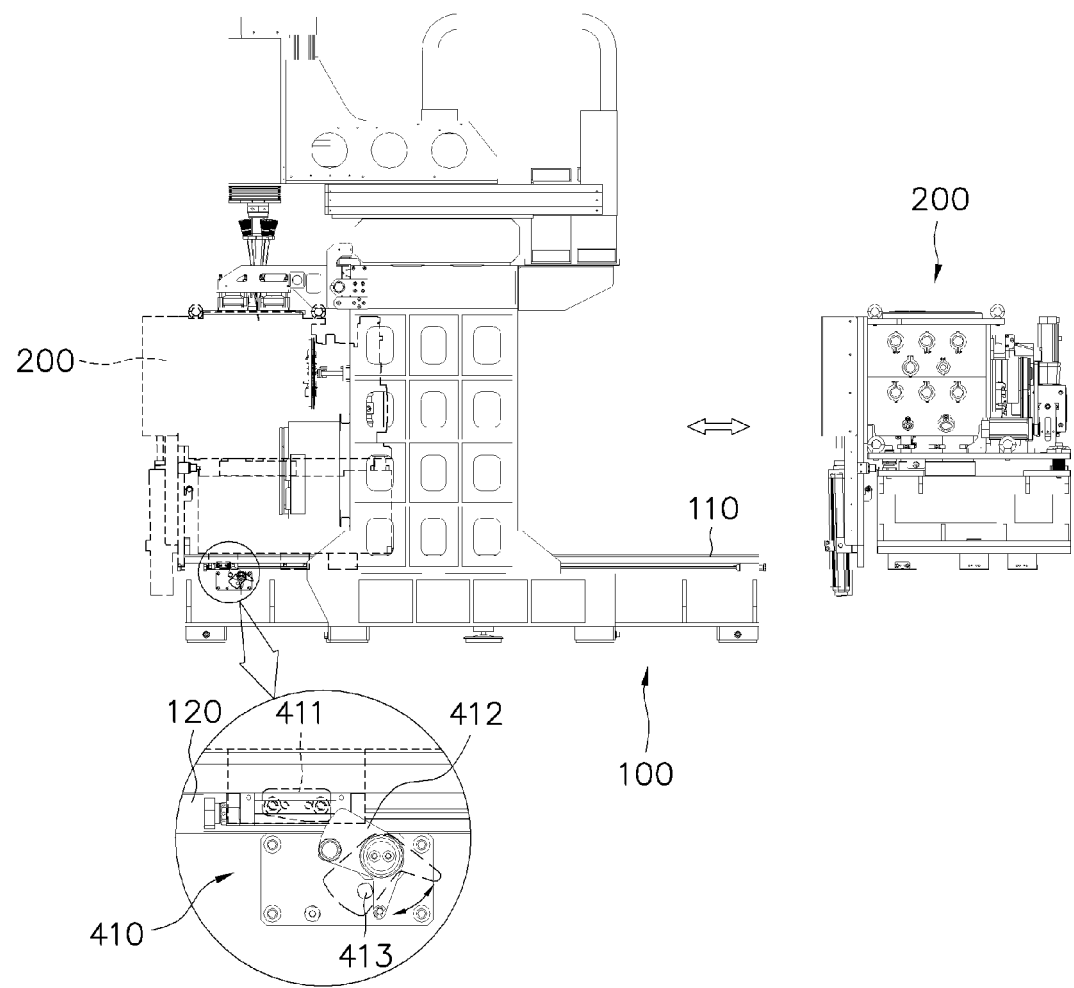
FIG. 3 illustrates a lateral structure view of a laser welding apparatus for spacer grid of nuclear fuel assembly according to the present invention.

In reference with FIG. 3, the welding chamber unit 200 is horizontally moved along the guide rail 110 of the base frame 100, and the welding chamber unit 200 is located forward to the damper 120 by moving along the guide rail 110. And then, the welding chamber unit 200 can be fixed by rotating the locking arm 412 to meet the locking block 411 and putting the locking pin 413 into the base frame 100.

Meanwhile, the welding chamber unit 200 can be detached at the rear of the base from 100 in inverse order of assembly.

Figure 4:
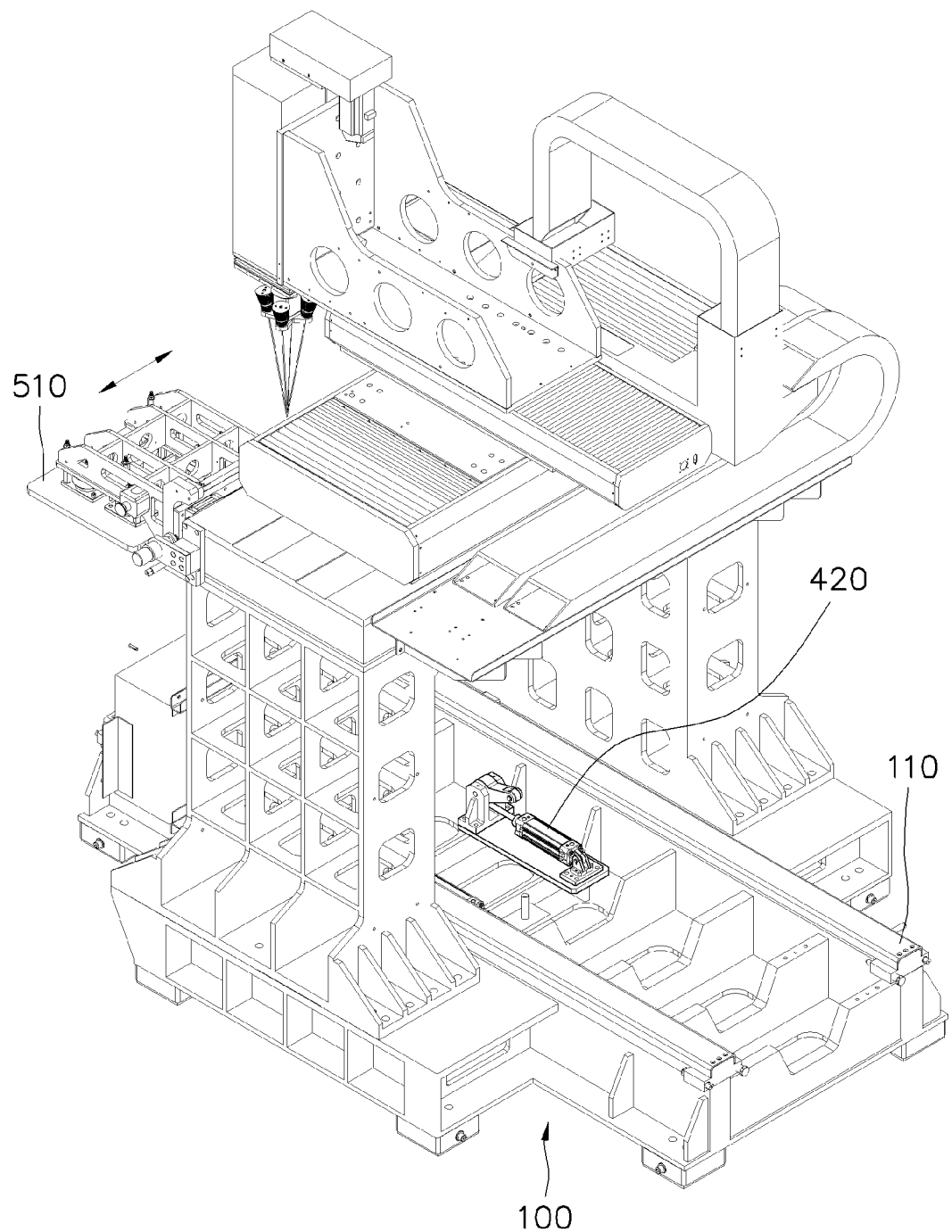
FIG. 4 illustrates a perspective view of a laser welding apparatus for spacer grid of nuclear fuel assembly according to the present invention.

FIG. 4 is a perspective view of a laser welding apparatus according to the present invention.

In reference with FIG. 4, a locking member 420 according to another exemplary embodiment is installed in the floor surface of the chamber installment hole and the welding chamber unit can be fixed by air pressure or oil pressure.

Figure 5A:
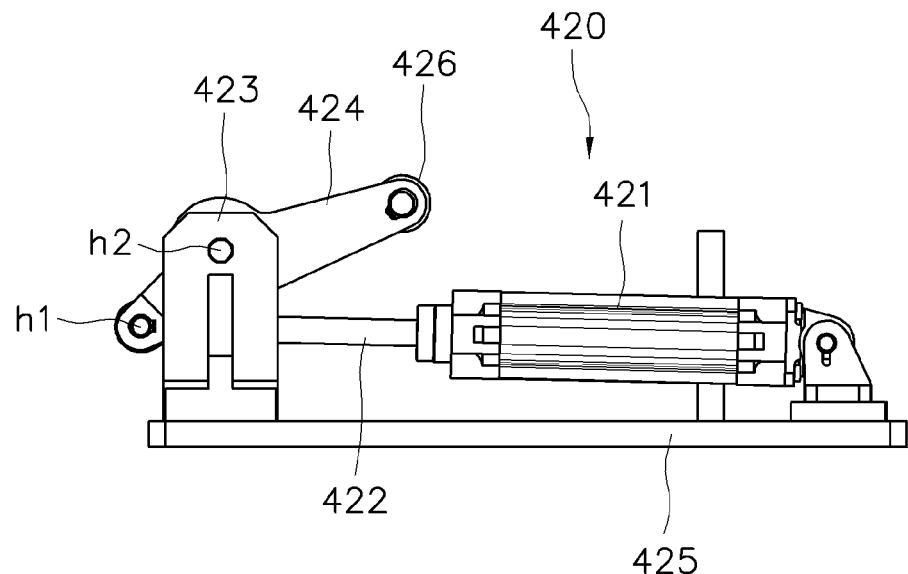
FIGS. 5A and 5B illustrates a locking member according to another exemplary embodiment of a laser welding apparatus for spacer grid of nuclear fuel assembly according to the present invention.

In reference with FIG. 5A, a locking member 420 according to another exemplary embodiment comprises a locking cylinder 421 for driving the cylinder load 422 back and forth, a bracket 423 installed on the floor surface of the chamber installment hole, and a locking lever 424 for supporting the welding chamber unit by being assembled to meet a bracket 423 and driven to rotated by the cylinder load 422.

The locking cylinder 421 and the bracket 423 are installed in the upper part of the base plate 425, the base plate 425 can be fixed on the floor surface of the chamber installment hole by welding or installed by a locking member such as a bolt.

The end of the cylinder load 422 is assembled to a hinge pin h1 so that it can be rotated with the locking lever 424, the middle of the locking lever 424 is assembled so that it can be rotated by the bracket 423 and the second hinge h2.

Preferably, a roller 426 of free meeting can be arranged in the end of the locking lever 424 which is contacted to the welding chamber unit.

Figure 5B:
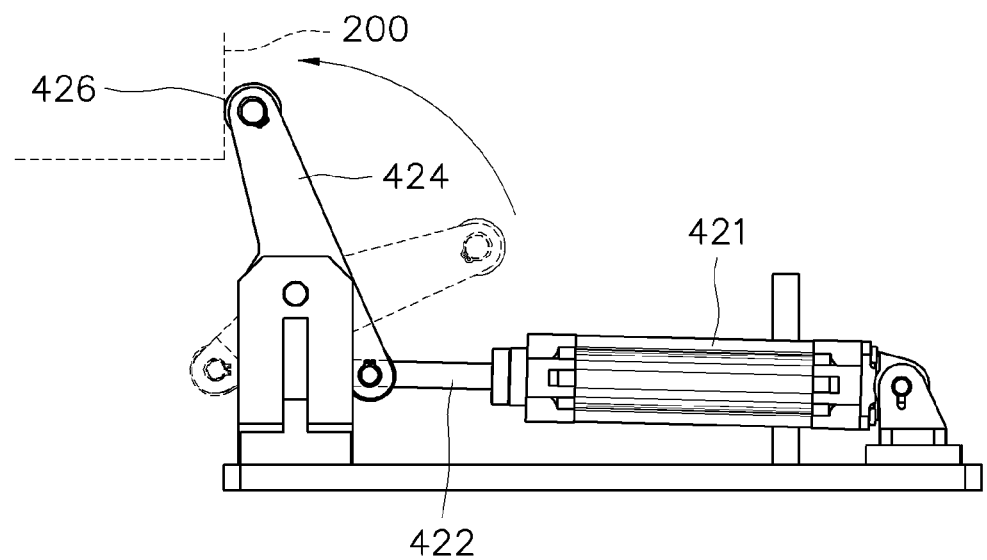

As shown in FIG. 5B, if the signal of air pressure or oil pressure is applied to the locking cylinder 421, the locking lever 424 is rotated counter-clockwise by the cylinder load 422 and accordingly the roller 426 of the end of the locking lever 424 pressurizes the side wall of the rear end of the welding chamber unit 200 which is located on inside of the chamber installment hole, thereby fixing the welding chamber unit 200 securely.

In the present exemplary embodiment, for rotary drive of the locking lever the cylinder driven by the signal of air pressure or air pressure was taken for example, however the present invention is not limited by this. Rotary drive can be operated by using a motorized actuator.

Besides, the welding chamber unit 200 which is detachably mounted on the base frame 100 adopts not only a structural locking member 410 but a locking member 420 driven independently by oil pressure, air pressure or electrical signal. Thereby the welding chamber unit 200 can be fixed reliably.

The present invention described above is not limited by the aforementioned embodiments and the accompanying drawings. It will be apparent to those who are skilled in the art that various substitution, variation and modification without departing from the scope of the spirit of the invention are possible.

What is claimed is:

1. A laser welding apparatus for spacer grid of nuclear fuel assembly, comprising:
   a base frame including a chamber installment hole, a guide rail installed along the chamber installment hole, and a damper arranged in an end of the guide rail;
   a welding chamber unit assembled with the base frame in guidance by the guide rail and equipped with an operable door in front and a glass window at the top to be airtight;
   a laser welding unit mounted on the base frame for radiating laser through the glass window to weld spacer grid in the welding chamber unit; and
   a locking member for fixing the welding chamber unit on the base frame,
   wherein the locking member comprises:
   a locking block protruding from a bottom of the welding chamber unit;
   a locking arm arranged so as to be pivoted to the base frame to support the locking block, the locking arm including a first wing and a second wing which respectively extend in different directions from a pivoting center, the first wing including a convex surface; and
   a locking pin mounted on the base frame for restricting rotation of the locking arm, wherein the damper restricts movement of the welding chamber unit toward the damper along the guide rail, and wherein the welding chamber unit is fixed on the base frame, such that the welding chamber unit is located adjacent to the damper with the movement of the welding chamber toward the damper being restricted and the damper facing a left side of the locking block, the locking arm, which has been rotated in a first direction, comes in contact with a right side of the locking block with the convex surface of the first wing being in direct contact with the locking block, and the locking pin comes in direct contact with the second wing and restricts the locking arm from further rotating in the first direction.

2. The welding apparatus for spacer grid of nuclear fuel assembly according to claim 1, wherein the base frame further comprises a glass cover prepared to cover the glass window.

3. The welding apparatus for spacer grid of nuclear fuel assembly according to claim 2, wherein a ventilation hole interconnected with the welding chamber unit is formed in a flange to which the glass window is fixed, and the flange is characterized by a ventilation valve arranged in the flange and controlled to be opened or closed by the glass cover.

4. The welding apparatus for spacer grid of nuclear fuel assembly according to claim 1, wherein the welding chamber unit comprises a position detecting unit for detecting the standard position of a driving pad which rotates a welding rotation plate in which the spacer grid is settled, and outputting an electrical detection signal.

5. The welding apparatus for spacer grid of nuclear fuel assembly according to claim 1, the locking member further comprises a handle bar protruding from the locking arm in a rotation axis direction of the locking arm.

* * * * *